(12) United States Patent
Saenz et al.

(10) Patent No.: US 12,741,711 B2
(45) Date of Patent: Sep. 22, 2026

(54) TOOL FOR INSTALLING HEADLINER IN A VEHICLE AND METHOD OF INSTALLING A HEADLINER IN A VEHICLE

(71) Applicant: Ford Motor Company, Dearborn, MI (US)

(72) Inventors: Carlos Ernesto Saenz, Calimaya (MX); Jesus Sanchez Llaca, Mexico City (MX); Cecilia Oddett Paredes Mancilla, Tlalnepantla de Baz (MX); Julio Adolfo Castillo, Mexico City (MX)

(73) Assignee: FORD MOTOR COMPANY, Dearborn, MI (US)

( * ) Notice: Subject to any disclaimer, the term of this patent is extended or adjusted under 35 U.S.C. 154(b) by 428 days.

(21) Appl. No.: 18/467,269

(22) Filed: Sep. 14, 2023

(65) Prior Publication Data

US 2025/0091530 A1 Mar. 20, 2025

(51) Int. Cl.

| | |
|---|---|
| ***B25B 11/00*** | (2006.01) |
| ***B25B 27/00*** | (2006.01) |
| ***B60R 13/02*** | (2006.01) |
| ***B62D 65/14*** | (2006.01) |

(52) U.S. Cl.
CPC ............ *B62D 65/14* (2013.01); *B25B 11/002* (2013.01); *B25B 27/0035* (2013.01); *B60R 13/0225* (2013.01)

(58) Field of Classification Search
CPC ............... B60R 13/0225; B25B 11/002; B25B 27/0035; B62D 65/14
See application file for complete search history.

(56) References Cited

U.S. PATENT DOCUMENTS

| | | | |
|---|---|---|---|
| 5,269,060 A | 12/1993 | Dowd et al. | |
| 5,331,525 A | 7/1994 | Lawassani et al. | |
| 5,380,978 A | 1/1995 | Pryor | |
| 6,324,948 B1 * | 12/2001 | Kavc | E05B 79/04 81/484 |
| 10,442,471 B2 | 10/2019 | Tulett et al. | |
| 2004/0090050 A1 | 5/2004 | Dominissini et al. | |
| 2005/0040627 A1 | 2/2005 | Depottey et al. | |
| 2006/0061145 A1 | 3/2006 | Strebe et al. | |

(Continued)

FOREIGN PATENT DOCUMENTS

| | | | |
|---|---|---|---|
| FR | 2987594 A1 * | 9/2013 | B25B 11/00 |
| FR | 3016575 A1 * | 7/2015 | B60R 13/0218 |
| JP | 2020060251 A * | 4/2020 | |

*Primary Examiner* — Daniel J Colilla
(74) *Attorney, Agent, or Firm* — Burris Law, PLLC

(57) ABSTRACT

A locator tool for a headliner assembly includes a base, first finger, second finger, and magnet. A proximal end portion of the first finger is fixedly coupled to a top portion of the base. The first finger extends in a first direction from the proximal end portion of the first finger to a distal end portion of the first finger. A proximal end portion of the second finger is fixedly coupled to the top portion of the base. The second finger extends in the first direction from the proximal end portion of the second finger to a distal end portion of the second finger. The second finger is spaced apart from the first finger by the top surface. The second finger extends in the first direction a lesser distance from the top surface than the first finger. The magnet is coupled to the distal end portion of the first finger.

20 Claims, 3 Drawing Sheets

(56) References Cited

U.S. PATENT DOCUMENTS

| | | | |
|---|---|---|---|
| 2006/0103172 | A1 | 5/2006 | Veen et al. |
| 2014/0001322 | A1 | 1/2014 | Joyce et al. |
| 2018/0281868 | A1 | 10/2018 | Tulett et al. |
| 2019/0141467 | A1 | 5/2019 | Breed |
| 2022/0089237 | A1 | 3/2022 | Sverdlov et al. |

* cited by examiner 26
118
126
122
34
62
10
126
18
114
126
226
22
Z
54
30
X
Y
38
50
14
42
46
130

210
62
26
28
34
10
22
214
18
54
30
Z
X
46
14
38
130
50

TOOL FOR INSTALLING HEADLINER IN A VEHICLE AND METHOD OF INSTALLING A HEADLINER IN A VEHICLE

FIELD

The present disclosure relates to a tool for use with installing a headliner in a vehicle and a method of using the tool to install the headliner in the vehicle.

BACKGROUND

The statements in this section merely provide background information related to the present disclosure and may not constitute prior art.

A headliner is typically attached to an interior side of a roof of a vehicle. The headliner typically has various features and apertures which must align properly with features or apertures of the roof. It can be difficult to properly align all of the features of the headliner with those of the roof while simultaneously attaching the headliner to the roof.

The teachings of the present disclosure address these and other issues with assembling a headliner to the roof of a vehicle.

SUMMARY

This section provides a general summary of the disclosure and is not a comprehensive disclosure of its full scope or all of its features.

In one form the present disclosure provides for a locator tool for a headliner assembly that includes a base, a first finger, a second finger, and a magnet. A top portion of the base includes a top surface. A proximal end portion of the first finger is fixedly coupled to the top portion of the base. The first finger extends in a first direction from the proximal end portion of the first finger to a distal end portion of the first finger. A proximal end portion of the second finger is fixedly coupled to the top portion of the base. The second finger extends in the first direction from the proximal end portion of the second finger to a distal end portion of the second finger. The second finger is spaced apart from the first finger by the top surface. The second finger extends in the first direction a lesser distance from the top surface than the first finger. The magnet is coupled to the distal end portion of the first finger.

In variations of the locator tool of the above paragraph, which can be implemented individually or in any combination: the distal end portion of the first finger defines a slot and the locator tool further comprises a bracket, the magnet being affixed to the bracket, the bracket being movable relative to the first finger between an attached position and a detached position, wherein in the attached position, at least a portion of the bracket is received in the slot and configured to inhibit movement of the magnet in the first direction relative to the first finger; the bracket and the slot are configured to permit the bracket to slide in a second direction from the attached position to the detached position, the second direction being transverse to the first direction; the second direction is angled toward the top surface; the locator tool further includes at least one detent coupled to the distal end portion of the first finger and configured to resist sliding of the bracket in the second direction from the attached position to the detached position; the base defines an aperture that extends in a second direction through opposite sides of the base, the second direction being transverse to the first direction; the base includes a protrusion that extends in a second direction from a side of the base and is configured to be gripped by a user, the second direction being transverse to the first direction; the top surface circumscribes at least three sides of the second finger; the top surface is perpendicular to the first direction; the magnet is coupled to the distal end portion of the first finger such that the magnet is configured to engage a vehicle panel at an angle relative to the top surface; the base, the first finger, and the second finger are integrally formed; the base, the first finger, and the second finger are a plastic material; the magnet is overmolded by the first finger.

In another form, the present disclosure provides for a locator tool for a headliner assembly including a base, a first finger, a second finger, a bracket, and a magnet. A top portion of the base includes a top surface. A proximal end portion of the first finger is fixedly coupled to the top portion of the base. The first finger extends in a first direction from the proximal end portion of the first finger to a distal end portion of the first finger. The distal end portion of the first finger defines a slot. A proximal end portion of the second finger is fixedly coupled to the top portion of the base. The second finger extends in the first direction from the proximal end portion of the second finger to a distal end portion of the second finger. The second finger is spaced apart from the first finger by the top surface. The second finger extends in the first direction a lesser distance from the top surface than the first finger. The bracket is movable relative to the first finger between an attached position and a detached position. The magnet is affixed to the bracket. In the attached position, at least a portion of the bracket is received in the slot and configured to inhibit movement of the magnet in the first direction relative to the first finger.

In variations of the locator tool of the above paragraph, which can be implemented individually or in any combination: the bracket and the slot are configured to permit the bracket to slide in a second direction from the attached position to the detached position, the second direction being transverse to the first direction; the second direction is angled toward the top surface.

In still another form, the present disclosure provides a method of assembling a headliner to a roof assembly of a vehicle. The roof assembly includes a lower roof panel below an upper roof panel. The method includes positioning a locator tool in an alignment position relative to the roof assembly. In the alignment position, a first finger of the locator tool extends through a first roof aperture of the lower roof panel and a magnet attached to the first finger magnetically engages the upper roof panel. In the alignment position, a second finger of the locator tool extends through a second roof aperture in the lower roof panel. The method includes positioning a headliner below the lower roof panel such that the locator tool extends through a headliner aperture defined by the headliner, a shape of the locator tool nesting within a shape of the headliner aperture. The method further includes attaching the headliner to the roof assembly while the locator tool is in the alignment position.

In variations of the method of the above paragraph, which can be implemented individually or in any combination: the first roof aperture is a sun visor bracket aperture; the method further includes inserting a sun visor bracket through the first roof aperture and attaching the sun visor bracket to the roof assembly; the method further includes removing the locator tool from the roof assembly and the headliner after attaching the headliner to the roof assembly.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figures 1, 2:
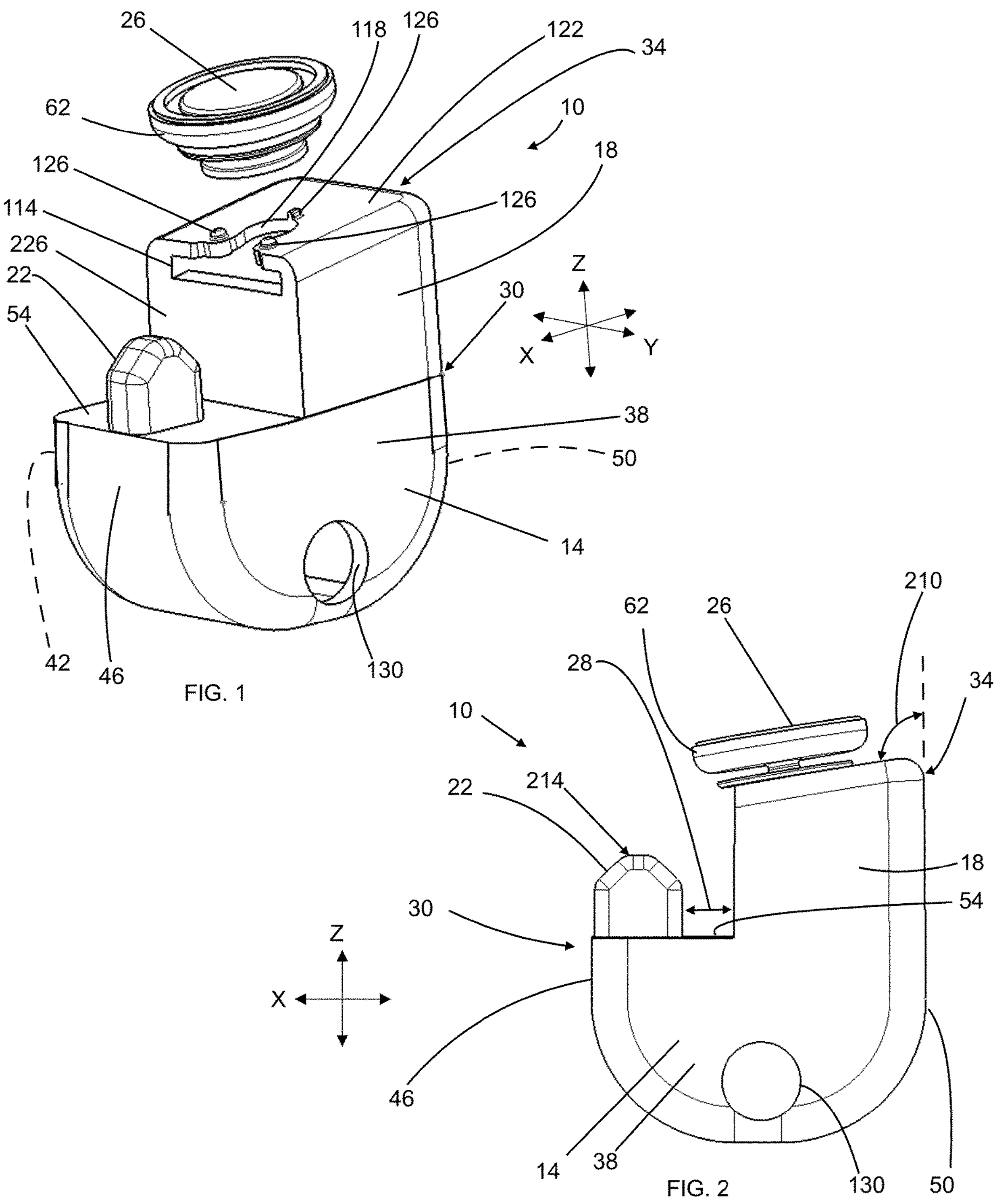
FIG. 1 is a perspective view of a tool for aligning a headliner on a vehicle roof according to the present disclosure.
FIG. 2 is a side view of the tool of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 and 2, a locator tool 10 is illustrated. The tool 10 includes a base 14, a first finger 18, a second finger 22, and a magnet 26. The first and second fingers 18, 22 are spaced apart by a gap 28 and extend upward (i.e., positive Z direction) from a top portion 30 of the base 14. The first finger 18 extends further upward from the base 14 than the second finger 22. The magnet 26 is coupled to a distal end portion 34 of the first finger 18.

In one form, the base 14, the first finger 18, and the second finger 22 are integrally or unitarily formed such as by molding, casting, or additive manufacturing for example. In another form, they can be separate pieces attached together, such as by welding, adhesive, or fasteners for example. In one form, the base 14, the first finger 18, and the second finger 22 are a plastic material, though other configurations can be used such as metal for example.

The base 14 has a shape that matches and fits within an aperture 314 (FIG. 3) defined by a headliner 310 (FIG. 3), as described in greater detail below. In the example provided, the base 14 has a left side 38, a right side 42, a front side 46, and a rear side 50, cooperating to form a generally rectangular shape (i.e., in a cross-section taken parallel to the X-Y plane shown in FIG. 1) and the aperture 314 (FIG. 3) has a similar but slightly larger rectangular shape. In an alternative form, not specifically shown, the base 14 and the aperture 314 can have a different matching shape. The left side 38 is parallel to the right side 42 and perpendicular to the front and rear sides 46, 50. In the example provided, the corners of the rectangular shape are rounded, though other configurations can be used. In the example provided, the left and right sides 38, 42 are longer than the front and rear sides 46, 50, though other configurations can be used depending on the shape of the aperture 314.

In the example provided, the top portion 30 of the base 14 includes a top surface 54. The first and second fingers 18, 22 extend upward from the top surface 54, with the top surface 54 extending between proximal ends of the first and second fingers 18, 22. In the example provided, the top surface 54 surrounds three sides (e.g., left, right, and rear) of second finger 22. In an alternative form, the top surface 54 may surround all four sides of the second finger 22 (e.g., left, right, front, and rear) to circumscribe the second finger 22. In the example provided, the top surface 54 is substantially flat and perpendicular to the sides 38, 42, 46, 50 of the base 14, though other configurations can be used. In the example provided, the first and second fingers 18, 22 both extend in an upward direction (i.e., positive Z direction) that is perpendicular to the top surface 54, though other configurations can be used.

In one form, the magnet 26 is removably coupled to the distal end portion 34 of the first finger 18. In the example provided, the magnet 26 is affixed to a bracket 62 and the bracket 62 is configured to be removably coupled to the first finger 18. In one form, not specifically shown, the bracket may be coupled to the first finger 18 via threads, such as being screwed into the first finger 18 or secured with a nut for example.

Figure 4:
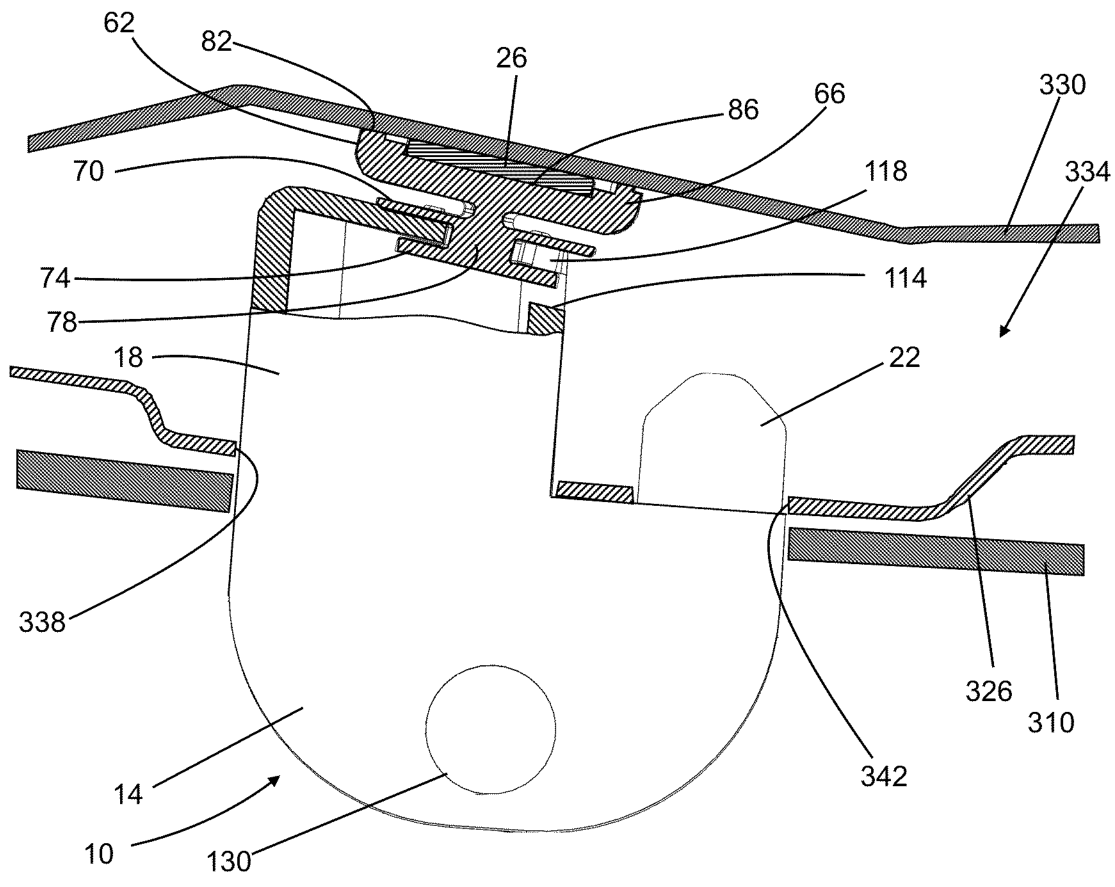
FIG. 4 is a schematic partial cross-sectional view of the tool of FIG. 1 attached to a roof of a vehicle, illustrating a headliner in an installed position according to the present disclosure.

With additional reference to FIG. 4, in the example provided, the bracket 62 includes a magnet holding portion 66, an upper flange 70, a lower flange 74, and a neck 78 connecting the upper and lower flanges 70, 74. The magnet holding portion 66 extends upward from the upper flange 70 and the magnet 26 is flush with or protrudes upward from an upper surface 82 of the magnet holding portion 66. In the example provided, the magnetic holding portion 66 defines a recess 86, that is bordered by the upper surface 82, in which the magnet 26 is received, though other configurations can be used, such as the upper surface 82 being flat and the magnet attached directly to the upper surface 82 for example.

The neck 78 is narrower than the upper flange 70 and the lower flange 74 in at least one direction. In the example provided, upper flange 70, the lower flange 74, and the neck 78 are round and coaxial such that the upper flange 70 and the lower flange 74 have greater diameters than the neck 78, though other configurations can be used, such as being rectangular for example.

In an alternative form, not specifically shown, the magnet 26 can be non-removably coupled to the distal end portion 34, such as by welding, adhesive, or being overmolded by the first finger 18 for example.

Referring to FIGS. 1 and 4, the distal end portion 34 of the first finger 18 can define a slot 114 and an aperture 118 that extends through a top surface 122 of the first finger 18 and opens into the slot 114. The slot 114 has a width greater than or equal to the width of the lower flange 74 and the aperture 118 generally has a width greater than or equal to the width of the neck 78. The slot 114 and aperture 118 both open through a common side of the first finger 18 and the neck 78 spaces the upper flange 70 away from the lower flange 74 by a distance such that the lower flange 74 can slide into the slot 114 while the neck 78 protrudes through the aperture 94 to position the upper flange 70 exterior of the first finger 18. In the example provided, the slot 114 and the aperture 118 are both open through a forward side 226 of the first finger 18, though other configurations can be used, such as being open through a different side. In one form, the aperture 118 can include a narrow portion proximate its opening at the forward side 226 and a wider portion further from the forward side 226. In this form, the narrow portion is slightly narrower than the neck 78 and the wider portion is wider than or equal to the neck 78 so that a predetermined amount of force is required to push the neck 78 past the narrow portion and the narrow portion can inhibit accidental removal of the bracket 62.

In the example provided, the top surface 122 is at an angle 210 relative to the upward direction such that the top surface 122 angles downward toward the forward side 226, though other configurations can be used, such as being perpendicular to the upward direction or angled in a different direction. As such the top surface 122 can be angled such that the height of the first finger 18 from the base 14 is less at the side through which the slot 114 is open. As a result, when the magnet 26 is magnetically engaged to a surface, pulling downward on the base 14 will not cause the bracket 62 to slide out of the slot 114. In configurations where the top surface 122 is angled, all locations on the top surface 122 are still further from the base 14 than the any point of the second finger 22.

The first finger 18 may optionally include one or more detents 126 configured to inhibit removal of the bracket 62 from the slot 114. The detents 126 may be protrusions that extend upward from the top surface 122 and are configured to engage the bottom side of the upper flange 70. The detents 126 may be a resilient material that biases the upper flange 70 generally in the upward direction.

The base 14 may optionally include a pull feature 130 configured to be gripped by a user or a tool (not shown) to pull the base 14 downward. In the example provided, the pull feature is an aperture open through the left and/or right sides 38, 42, and sized to permit a user's finger(s) (not shown) to be inserted at least partially therein so that a user may pull downward on the base 14 via the aperture. In an alternative form, not specifically shown, the pull feature 130 can be a protrusion on the left and/or right sides 38, 42. The pull feature may, alternatively or additionally, be on the front and/or rear sides 46, 50.

A distal end portion 214 of the second finger 22 may optionally be tapered such that the second finger 22 narrows toward the upward direction, as shown in the example provided.

In the example provided, the second finger 22 has a generally rectangular shape taken parallel to the X-Y plane. The second finger 22 may have a width in the X-direction and a thickness in the Y-direction. In one form, the width of the second finger 22 and the thickness of the second finger 22 are nominally sized to fit within the second roof aperture 342 with a clearance of approximately 0.9 mm around the second finger 22. In one form, the width and thickness dimensions of the second finger 22 are held within a tolerance of ±0.5 mm, though other configurations can be used.

In the example provided, the first finger 18 has a generally rectangular shape taken parallel to the X-Y plane. The first finger 18 may have a width in the X-direction and a thickness in the Y-direction. In one form, the thickness is equal to the thickness in the Y-direction between the left and right sides 38, 42, though other configurations can be used. In one form, the width of the first finger 18 and the thickness of the first finger 18 are nominally sized to fit within the first roof aperture 338 with a clearance of approximately 1.44 mm around the first finger 18. In one form, the width and thickness dimensions of the first finger 18 are held within a tolerance of ±0.5 mm, though other configurations can be used.

In one form, the distance between the front and rear sides 46, 50 is less than 50 mm, and the distance between the left and right sides 38, 42 is less than 30 mm, though other configurations can be used.

Figure 3:
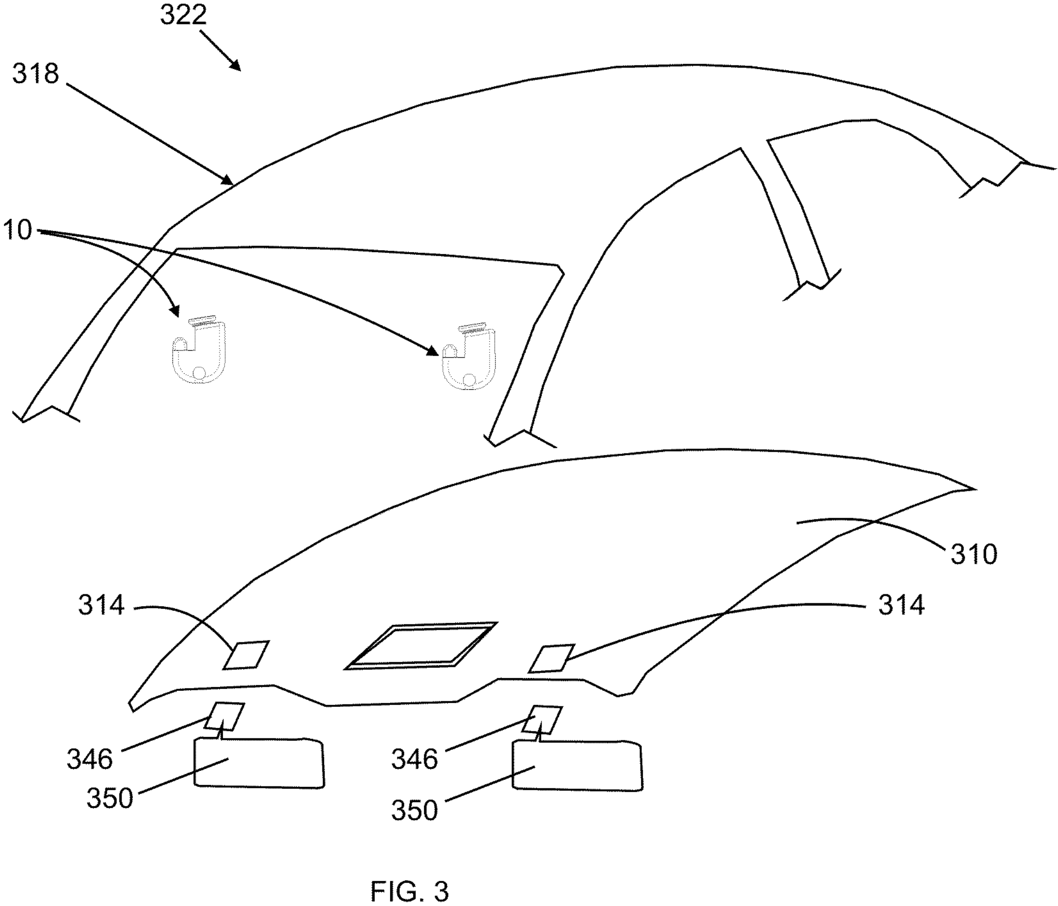
FIG. 3 is a schematic exploded perspective view illustrating the pair of the tools of FIG. 1 with a roof of a vehicle, a headliner, and a sun visor assembly according to the present disclosure.

Referring to FIGS. 3 and 4, the locator tool 10 is configured to assist in assembling the headliner 310 to a roof assembly 318 a vehicle 322. The roof assembly 318 can include a lower roof panel 326 and an upper roof panel 330. The lower roof panel 326 is coupled to the upper roof panel 330 in any suitable manner, such as by welding, crimps, rivets, adhesive and/or fasteners for example. The lower roof panel 326 and the upper roof panel 330 cooperate to define a cavity 334 therebetween. The lower roof panel 326 defines a first roof aperture 338 open through the lower roof panel 326 and open into the cavity 334. The lower roof panel 326 also defines a second roof aperture 342 open through the lower roof panel 326 and open into the cavity 334.

In the example provided, the first roof aperture 338 is configured to receive a bracket 346 that is configured to couple a sun visor 350 to the roof assembly 318. In the example provided, the second roof aperture 342 is configured to receive a clip (not shown) or other component after the headliner 310 is installed.

The first roof aperture 338 is shaped to receive the first finger 18 therethrough and the second roof aperture 342 is shaped to receive the second finger 22 therethrough when the first finger 18 is received through the first roof aperture 338. As such, the first roof aperture 338 is spaced apart from the second roof aperture 342 by a distance substantially equal to or less than the gap 28.

The height of the first finger 18 is such that the magnet 26 is able to magnetically engage the upper roof panel 330 when the first and second fingers 18, 22 are received in the first and second roof apertures 338, 342. This position, shown in FIG. 4, is referred to herein as the alignment position. In the example provided the magnet 26 contacts the upper roof panel 330 in this alignment position, though other configurations can be used. The height of the second finger 22 is such that the second finger 22 does not contact the upper roof panel 330 when in the alignment position.

To install the headliner, 310, the locator tool 10 is positioned in the alignment position. Optionally, additional instances of the locator tool 10 may be positioned in corresponding alignment positions relative to additional apertures. For example, one locator tool 10 can be positioned in the alignment position relative to the apertures 338, 342 that correspond to the left sun visor 350 and a second locator tool 10 can be positioned in the alignment position relative to similar apertures that correspond to the right sun visor 350.

Then, the headliner 310 can be positioned below the lower roof panel 326 and raised upward until the base 14 of each locator tool 10 is received through the corresponding aperture 314 of the headliner.

Figure 5:
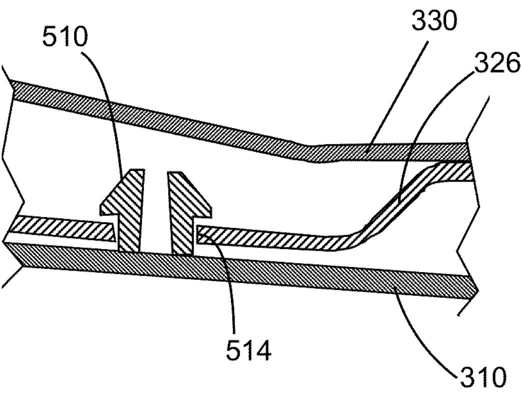
FIG. 5 is a schematic cross-sectional view of a clip coupling a headliner to a roof of a vehicle according to the present disclosure.

Then, the headliner 310 can be attached to the roof assembly 318 in this position, such as by clips 510 (FIG. 5). In one form, the clips 510 are push clips that are attached to the headliner 310 and resiliently snap into an aperture 514 defined by the lower roof panel 326 and hold the headliner 310 relative to the lower roof panel 326.

Once the headliner 310 is sufficiently attached to the roof assembly 318, each locator tool 10 can be removed and the brackets 346 and sun visors 350 can be installed. The locator tool 10 can be removed by pulling downward on the base 14, such as via the pull feature 130 for example.

Thus, the locator tool 10 assists quick and proper alignment and attachment of the headliner 310 to the roof assembly 318.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A locator tool for a headliner assembly, the locator tool comprising:

a base, a top portion of the base including a top surface;

a first finger, a proximal end portion of the first finger being fixedly coupled to the top portion of the base, the first finger extending in a first direction from the proximal end portion of the first finger to a distal end portion of the first finger;

a second finger, a proximal end portion of the second finger being fixedly coupled to the top portion of the base, the second finger extending in the first direction from the proximal end portion of the second finger to a distal end portion of the second finger, wherein the second finger is spaced apart from the first finger by the top surface, wherein the second finger extends in the first direction a lesser distance from the top surface than the first finger; and a magnet coupled to the distal end portion of the first finger.

2. The locator tool according to claim 1, wherein the distal end portion of the first finger defines a slot and the locator tool further comprises a bracket, the magnet being affixed to the bracket, the bracket being movable relative to the first finger between an attached position and a detached position, wherein in the attached position, at least a portion of the bracket is received in the slot and configured to inhibit movement of the magnet in the first direction relative to the first finger.

3. The locator tool according to claim 2, wherein the bracket and the slot are configured to permit the bracket to slide in a second direction from the attached position to the detached position, the second direction being transverse to the first direction.

4. The locator tool according to claim 3, wherein the second direction is angled toward the top surface.

5. The locator tool according to claim 4, further comprising at least one detent coupled to the distal end portion of the first finger and configured to resist sliding of the bracket in the second direction from the attached position to the detached position.

6. The locator tool according to claim 1, wherein the base defines an aperture that extends in a second direction through opposite sides of the base, the second direction being transverse to the first direction.

7. The locator tool according to claim 1, wherein the base includes a protrusion that extends in a second direction from a side of the base and is configured to be gripped by a user, the second direction being transverse to the first direction.

8. The locator tool according to claim 1, wherein the top surface circumscribes at least three sides of the second finger.

9. The locator tool according to claim 1, wherein the top surface is perpendicular to the first direction.

10. The locator tool according to claim 9, wherein the magnet is coupled to the distal end portion of the first finger such that the magnet is configured to engage a vehicle panel at an angle relative to the top surface.

11. The locator tool according to claim 1, wherein the base, the first finger, and the second finger are integrally formed.

12. The locator tool according to claim 11, wherein the base, the first finger, and the second finger are a plastic material.

13. The locator tool according to claim 1, wherein the magnet is overmolded by the first finger.

14. A locator tool for a headliner assembly, the locator tool comprising:

a base, a top portion of the base including a top surface;

a first finger, a proximal end portion of the first finger being fixedly coupled to the top portion of the base, the first finger extending in a first direction from the proximal end portion of the first finger to a distal end portion of the first finger, the distal end portion of the first finger defining a slot;

a second finger, a proximal end portion of the second finger being fixedly coupled to the top portion of the base, the second finger extending in the first direction from the proximal end portion of the second finger to a distal end portion of the second finger, wherein the second finger is spaced apart from the first finger by the top surface, wherein the second finger extends in the first direction a lesser distance from the top surface than the first finger;

a bracket movable relative to the first finger between an attached position and a detached position; and a magnet affixed to the bracket, wherein in the attached position, at least a portion of the bracket is received in the slot and configured to inhibit movement of the magnet in the first direction relative to the first finger.

15. The locator tool according to claim 14, wherein the bracket and the slot are configured to permit the bracket to slide in a second direction from the attached position to the detached position, the second direction being transverse to the first direction.

16. The locator tool according to claim 15, wherein the second direction is angled toward the top surface.

17. A method of assembling a headliner to a roof assembly of a vehicle, the roof assembly including a lower roof panel below an upper roof panel, the method comprising:

positioning a locator tool in an alignment position relative to the roof assembly, wherein in the alignment position, a first finger of the locator tool extends through a first roof aperture of the lower roof panel and a magnet attached to the first finger magnetically engages the upper roof panel, wherein in the alignment position, a second finger of the locator tool extends through a second roof aperture in the lower roof panel;

positioning a headliner below the lower roof panel such that the locator tool extends through a headliner aperture defined by the headliner, a shape of the locator tool nesting within a shape of the headliner aperture; and attaching the headliner to the roof assembly while the locator tool is in the alignment position.

18. The method according to claim 17, wherein the first roof aperture is a sun visor bracket aperture.

19. The method according to claim 18, further comprising inserting a sun visor bracket through the first roof aperture and attaching the sun visor bracket to the roof assembly.

20. The method according to claim 17, further comprising removing the locator tool from the roof assembly and the headliner after attaching the headliner to the roof assembly.

* * * * *